United States Patent
Ostrovsky et al.

(10) Patent No.: US 6,826,671 B2
(45) Date of Patent: Nov. 30, 2004

(54) METHOD AND DEVICE FOR A CONTEXT-BASED MEMORY MANAGEMENT SYSTEM

(75) Inventors: Boris Ostrovsky, Sudbury, MA (US); Daniel R. Cassiday, Topsfield, MA (US); John R. Feehrer, Westford, MA (US); David A. Wood, Madison, WI (US); Pazhani Pillai, Billerica, MA (US); Christopher J. Jackson, Westford, MA (US); Mark Donald Hill, Madison, WI (US)

(73) Assignee: Sun Microsystems, Inc., Santa Clara, CA (US)

( * ) Notice: Subject to any disclaimer, the term of this patent is extended or adjusted under 35 U.S.C. 154(b) by 462 days.

(21) Appl. No.: 09/973,279

(22) Filed: Oct. 9, 2001

(65) Prior Publication Data

US 2003/0070058 A1 Apr. 10, 2003

(51) Int. Cl.⁷ .................................. G06F 12/10
(52) U.S. Cl. ................ 711/207; 711/156; 711/159
(58) Field of Search ................. 711/206, 207, 711/156, 159

(56) References Cited

U.S. PATENT DOCUMENTS

| | | | |
|---|---|---|---|
| 5,293,597 A | | 3/1994 | Jensen et al. |
| 5,630,087 A | * | 5/1997 | Talluri et al. ............. 711/202 |
| 5,696,925 A | | 12/1997 | Koh |
| 5,890,189 A | | 3/1999 | Nozue et al. |
| 5,978,594 A | | 11/1999 | Bonnell et al. |
| 6,233,667 B1 | | 5/2001 | Shaylor et al. |

* cited by examiner

Primary Examiner—Jack Lane
(74) Attorney, Agent, or Firm—Meyertons Hood Kivlin Kowert & Goetzel, P.C.; B. Noël Kivlin

(57) ABSTRACT

A method and device for virtual memory support in a computer system using a mapping structure for address translation. Mapping indicators are associated with each process context and each mapping structure entry. When a context is demapped the mapping indicator associated with the context is changed and the mapping indicator in each mapping structure entry is employed to immediately invalidate further memory accesses for that context.

22 Claims, 5 Drawing Sheets

METHOD AND DEVICE FOR A CONTEXT-BASED MEMORY MANAGEMENT SYSTEM

TECHNICAL FIELD

The present invention relates to methods and devices for controlling access to physical memory in computer systems using virtual memory techniques.

BACKGROUND ART

To allow many processes to share a limited amount of physical memory in a computer system, modern operating systems (such as Sun Microsystem's Solaris™ operating system ("OS")) implement virtual memory, which provides a mapping between a process's virtual address space and physical addresses. The operation of virtual memory in a computer system is described in John L. Hennessey and David A. Patterson, Computer Architecture: A Quantitative Approach, pp. 427–472 (2d ed. 1995), which is incorporated herein by reference.

Since more than one process may map its virtual addresses to the same physical location, tagging is necessary to identify which process is currently attempting to access memory. These tags are referred to as contexts. When a process attempts to access a (virtual) address, the process presents this address and the context to a memory management unit ("MMU"). The MMU then consults appropriate data structures that store either all or some subset of virtual-to-physical translations used by the system. These data structures may, for example, be organized as a table, a hierarchy of tables or a linked list. These data structures will be referred to hereafter as "mapping structures." Such address translations are often cached in a special mapping structure called a translation lookaside buffer ("TLB"), which may have hardware support for speed of accessing translation entries.

The operating system may need to invalidate (demap) the address space of a particular process. Demapping may occur, for example, when a process exits and the OS decides to reuse the context for another process. If the mapping structure resides in memory, rather than in special purpose hardware that supports associative searching, demapping a context may require scanning the whole mapping structure. For very large mapping structures, scanning the structure can present a performance problem. For example, the OS needs to be certain that a context demapping operation has completed before the OS can proceed. Otherwise, another mapping for the same context and virtual address can be created, and, if two mappings exist, incorrect translations can occur. The scanning process to demap a process may take a long time to complete, degrading system performance. If the memory that stores the mapping structure is also used for other data, attempting to complete the demapping process as soon as possible will consume a substantial portion of the memory bandwidth, delaying satisfaction of requests from other clients trying to access non-mapping-structure data.

SUMMARY OF THE INVENTION

In accordance with an embodiment of the present invention, a method is presented for controlling virtual memory in a computer system with a plurality of process contexts. The system contains an address translation mapping structure with a plurality of address translation entries. Each translation entry includes a validity flag and a mapping indicator. A mapping indicator and a cleanup indicator are also maintained for each process context in a context table. When each translation entry is initialized, the entry's validity flag is set and the mapping indicator is set equal to the mapping indicator for the associated context. A process context is demapped by changing the mapping indicator for the context and the cleanup indicator for the context. Memory accesses using a translation entry associated with the demapped context are invalidated since the mapping indicator for the entry does not match the mapping indicator for the context. This embodiment advantageously invalidates all the mapping structure entries associated with a demapped context by changing a single indicator.

In a further embodiment of the invention, a background process scans the cleanup indicator for each context. When the cleanup indicator for any context indicates that the context has been demapped, the process scans the mapping structure. The validity flag for an entry is cleared if the mapping indicator for the entry does not match the context mapping indicator for its associated context. All of the cleanup indicators that indicated that the associated context had been demapped at the start of the scan of the mapping structure are changed to indicate the background process was run, when the scan is completed.

In a memory management device embodiment of the present invention for a computer system, a mapping structure with a plurality of translation entries is included. Each translation entry includes a validity flag and a mapping indicator. A context mapping indicator and a cleanup indicator are provided for each of a plurality of process contexts in a context table. Logic is included that loads each translation entry by setting the entry's validity flag and setting the mapping indicator for the entry equal to the mapping indicator for the associated context. Logic is included that demaps a process context by changing the mapping indicator for the context and the cleanup indicator for the context. Logic is further included that invalidates memory accesses that require translation entries associated with the demapped context, by checking that the mapping indicator for the entry does not match the mapping indicator for the context.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
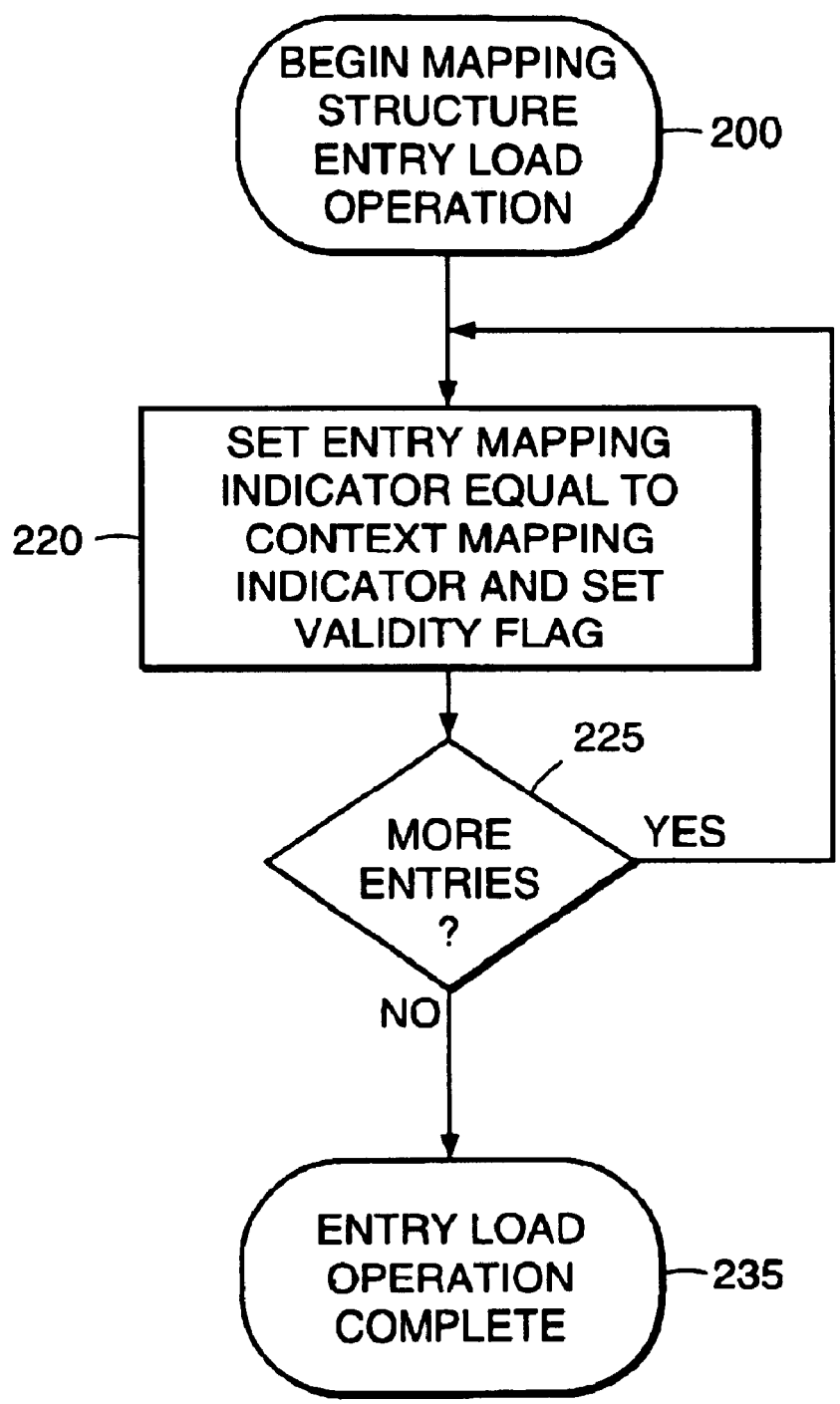
FIG. 1 is a flow chart illustrating loading mapping structure entries according to an embodiment of the invention.
Figure 2:
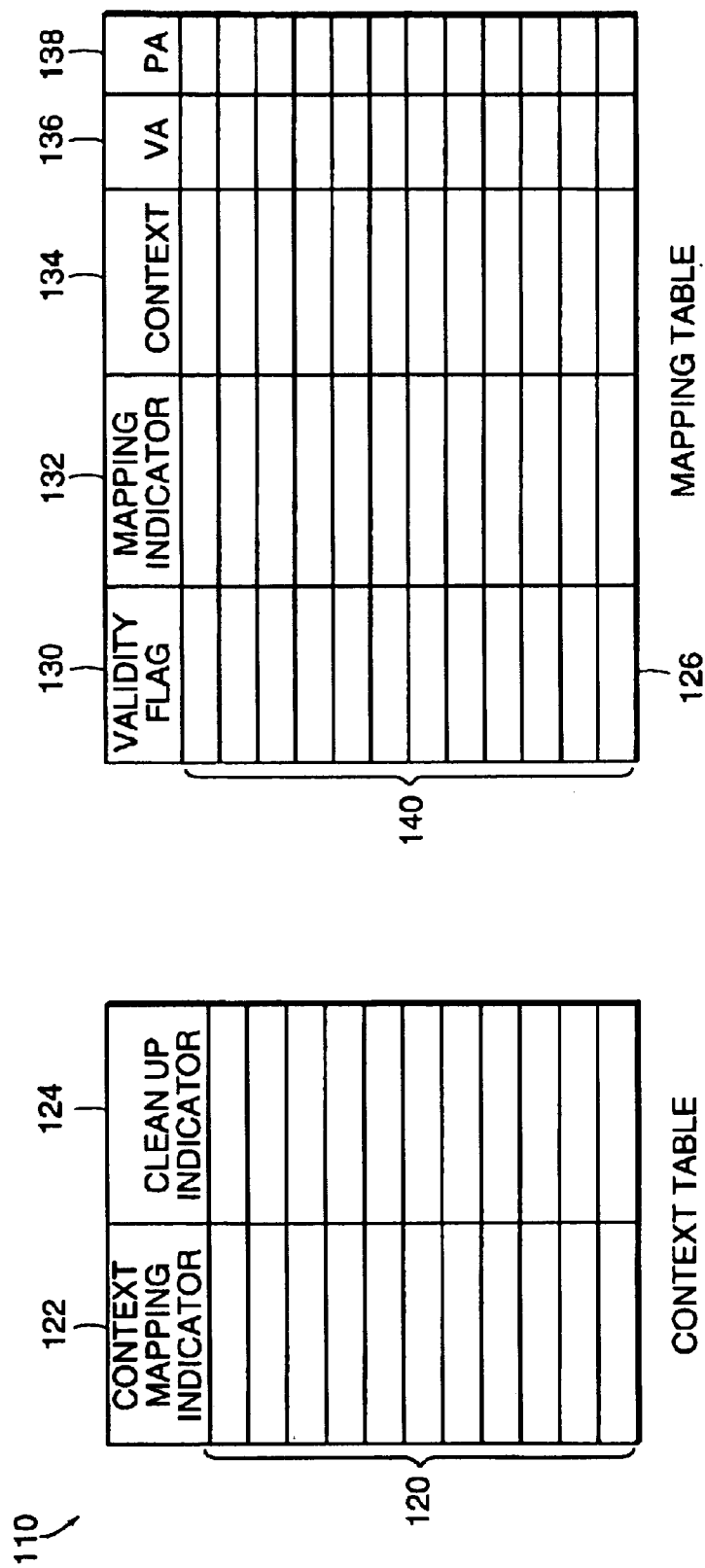
FIG. 2 is a block diagram for a portion of a memory management unit that includes a context table and a mapping table according to an embodiment of the invention.

FIG. 1. shows a method for controlling virtual memory in a computer system have a plurality of process contexts according to an embodiment of the present invention. FIG. 2 shows a portion of a memory management unit 100 employed in the method. A context table 110 contains an entry 120 for each context in the system. Each context table entry 120 includes a context mapping indicator 122 and a cleanup indicator 124. Note that as used in this description and in any appended claims, the term "indicator" will be understood to include a single-bit indicator, a multi-bit-indicator, a counter or any other structure that can denote a plurality of states for a variable. The unit also includes a mapping structure in the form of a table 126. Note that as used in this description and in any appended claims, the term "mapping structure" will be understood to include a table, a hierarchy of tables, a linked list or any other data structure that can include a collection of address translation entries. When the system needs to load a mapping structure entry, a mapping structure entry load operation is initiated 200. As each entry 140 in the mapping structure 126 is loaded with a virtual address 136 corresponding to a physical memory address 138 for the associated context, a validity flag 130 and a context tag 134 for the entry 140 are set 220. The translation entry mapping indicator 132 is set equal 220 to the context mapping indicator 122 for the associated context. The context tag 134 uniquely identifies one of the process contexts that will be associated with the mapping structure entry. If more entries need to be loaded 225, the process 220 is repeated. The mapping structure entry load operation is then complete 235.

In a specific embodiment of the present invention, the mapping structure comprises a translation lookaside buffer, that is used to cache address translations.

In another specific embodiment of the present invention, the mapping structure comprises a table or a hierarchy of tables.

In a further specific embodiment, the cleanup indicator for each context, the mapping indicator for each context, the mapping indicator for each translation entry and the validity flag for each translation entry are each a single bit.

Figure 3:
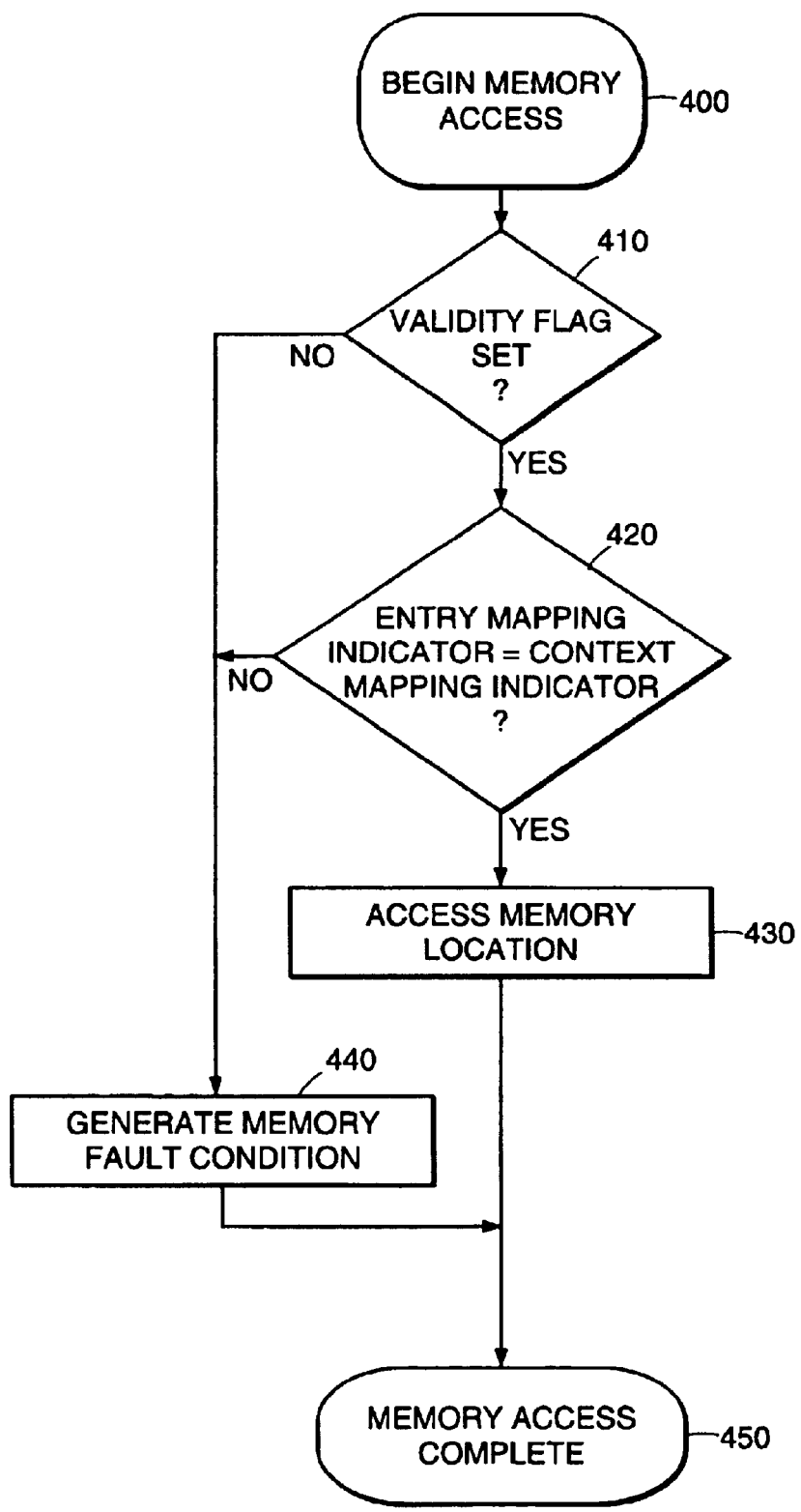
FIG. 3 is a flow diagram illustrating a memory access operation.

As shown in FIG. 3, a memory access for a given context and virtual address is initiated 400 by reading a selected entry 140 in the mapping structure. The entry is selected by matching the context tag for the given context and the target virtual address with the context tag and virtual address tag in each entry. The validity flag 130 is checked for the entry 410 and if the flag is cleared, logic in the memory management unit responds with a fault condition 440. If the validity flag is set, then logic checks the mapping indicator for the entry 420, and if the mapping indicator 132 for the entry does not match the context mapping indicator 122 for the associated context, logic responds with a fault condition 440. This fault condition 440 can be handled using software, hardware, or a combination of hardware and software. Otherwise, memory is accessed 430 and the memory access operation is completed 450.

Figure 4:
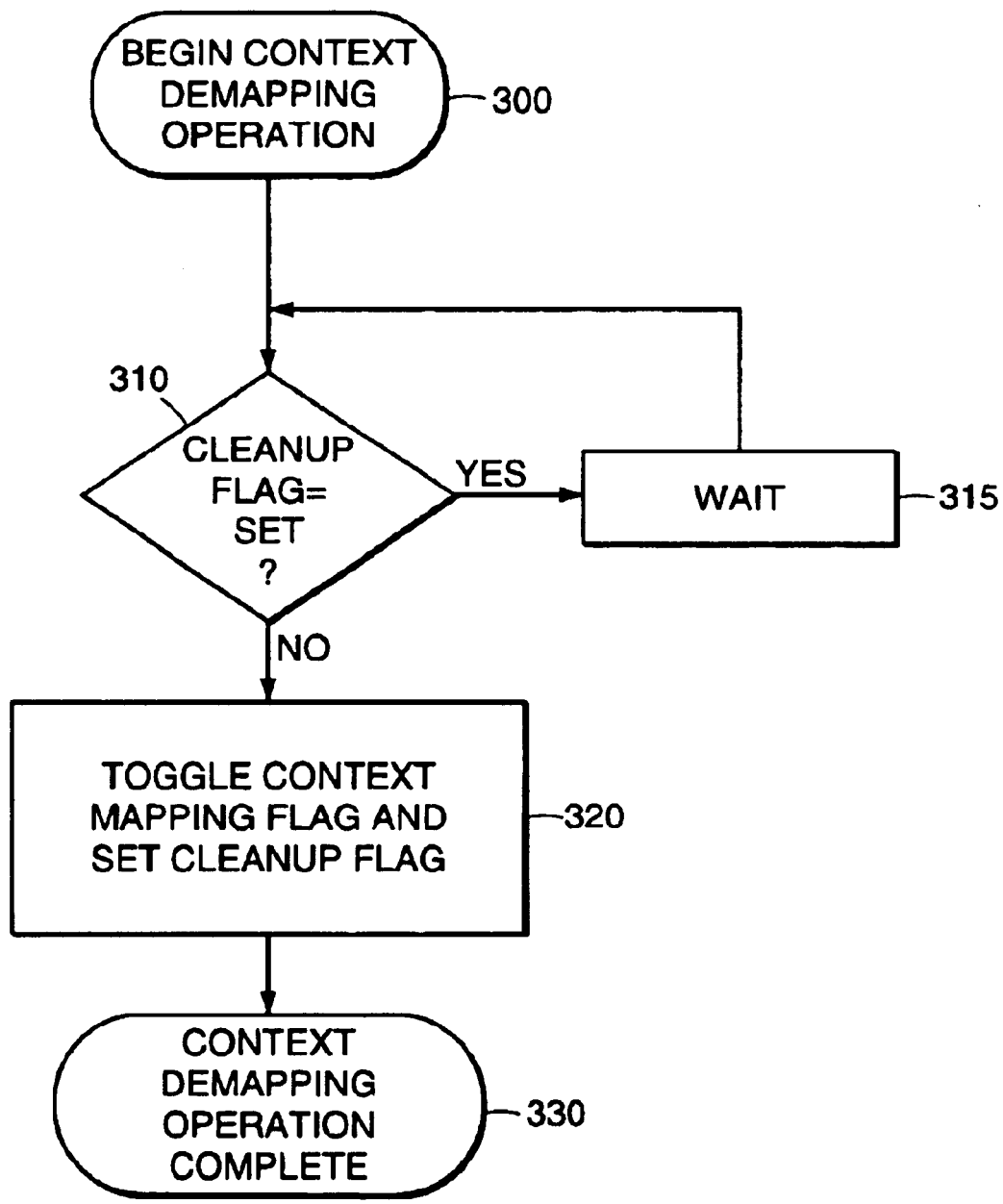
FIG. 4 is a flow diagram illustrating a context demapping operation.

When a given process context needs to be demapped, a context demapping operation begins 300, as shown in FIG. 4. This operation will first be described for an embodiment where the mapping indicator and the cleanup indicator are represented by flags that are either set or cleared. If the cleanup flag for the context is in a "cleared" state 310, the context mapping flag 122 for the given context is toggled 320. When a memory access is attempted to any location associated with the given context, a fault condition will occur since the given context mapping flag 122 will not equal 420 the translation entry mapping flag 132. Thus, a context demapping operation is quickly completed 330 without the need to access and invalidate every mapping structure entry for the given context. Further, the context tag for the demapped context may be immediately used for mapping a new process. This follows since the entries currently in the mapping structure corresponding to the demapped context cannot be used to generate a valid memory access, since the mapping flags for these entries do not match the mapping flag for the demapped context. These entries can be used to generate a valid memory access only after a given entry has been reloaded and the given entry's mapping flag has been set equal to an associated context's mapping flag. The cleanup flag is set 320 and the demapping operation is complete 330.

In this embodiment, if the cleanup flag for the context is in a "set" state 310 when the demapping operation 300 begins, the previous demap operation is still in progress and the system waits 315.

Figure 5:
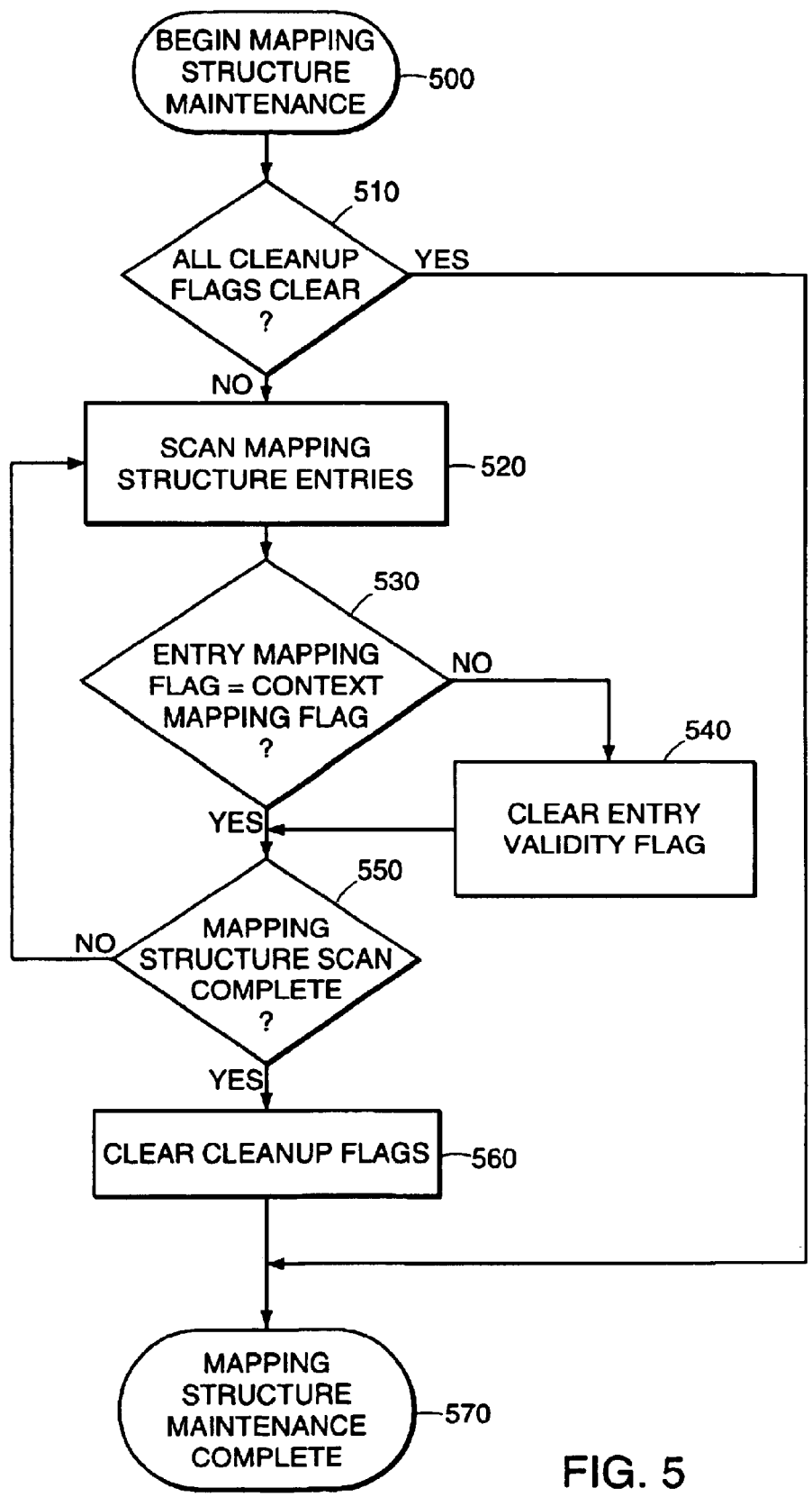
FIG. 5 is a flow diagram showing maintenance of the mapping structure.

Maintenance of the mapping structure 126 for this embodiment can run as a lower priority background process 500, as shown in FIG. 5. The context table 110 is scanned 510 to see if the cleanup flag 124 for any context is set. If not, the mapping structure maintenance operation exits 570, the operation to be run again periodically. If any cleanup flag 124 is set, a list of the contexts whose cleanup flags are set, is stored. The mapping structure is then scanned to identify entries where the mapping flag 132 for the entry does not equal 530 the associated context mapping flag 122. For each such entry 140, the validity flag is cleared 540 and the scan continues 520. When the scan is completed 550, the cleanup flag 124 is cleared 560 for each context 120 whose cleanup flag was set when the context structure was scanned 510.

The demapping operation 300 and the maintenance of the mapping structure operation 500 can be generalized for those cases where the mapping indicators and cleanup indicators can assume more than two states, such as the case where these indicators are multi-bit counters. In such an embodiment of the present invention, additional "versions" of a context are available for mapping before the maintenance operation 500 is run, i.e. a context tag can be reused unless the cleanup indicator indicates that all of the context versions have been demapped and the maintenance operation 500 has not been run. If the cleanup indicator for the context indicates that additional context versions are available for use, the context mapping indicator 122 for the given context is changed. When a memory access is attempted to any location associated with the given context version, a fault condition will occur since the given context mapping indicator 122 will not equal 420 the translation entry mapping indicator 132. Thus, a context demapping operation is quickly completed without the need to access and invalidate every mapping structure entry for the given context. Further, the context tag for the demapped context may be immediately used for mapping a new process. The cleanup indicator is changed 320 and the demapping operation is complete 330.

If the cleanup indicator for the context indicates that all of the context versions have been demapped and the maintenance operation 500 has not been completed, when the demapping operation 300 begins, a previous demap operation is still in progress and the system waits.

For example, in a specific embodiment, the mapping and cleanup indicators are wrap-around counters. Each indicator has a maximum value of MAX_VALUE and is initially set to zero. A context version can be demapped by incrementing the mapping indicator and cleanup indicator for the context, after checking that the cleanup indicator does not equal MAX_VALUE. When the maintenance operation 500 runs, the current cleanup indicator value for each context is stored at the beginning of the scan of the mapping structure. When the scan of the mapping structure is completed, the cleanup indicator for each context is decremented by the cleanup indicator value as it was stored at the start of the scan.

If the cleanup indicator for the context equals MAX_VALUE when the demapping operation 300 begins, no further versions of the context are available to map the context and the system waits until the maintenance operation is run to free-up more versions of the context. Embodiments of the present invention that permit the cleanup and mapping indicators for a context to assume more than two values advantageously allow the maintenance operation 500 to be run less frequently.

The foregoing embodiments are used to illustrate the use of mapping and cleanup indicators and are not intended to limit the scope of the present invention. Other equivalent variants of the present invention using cleanup and mapping indicators can be employed without departing from the true scope of the present invention.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The present invention may be embodied in other specific forms without departing from the true scope of the invention. The described embodiments are to be considered in all respects only as illustrative and not restrictive.

What is claimed is:

1. A method for controlling virtual memory in a computer system with a plurality of process contexts, wherein the system comprises a mapping structure for address translations, wherein the mapping structure comprises a plurality of translation entries, the method comprising:

setting a translation entry mapping indicator for each translation entry associated with a given context to the value of a mapping indicator for the given context;

setting a validity flag for each translation entry associated with the given context; and demapping the given context by changing the mapping indicator and a cleanup indicator for the given context.

2. A method according to claim 1, wherein each translation entry comprises a context tag to identify one of the contexts to be associated with the translation entry.

3. A method according to claim 1, wherein the cleanup indicator for each context, the mapping indicator for each context, the mapping indicator for each translation entry and the validity flag for each translation entry are each a single bit.

4. A method according to claim 1, wherein the mapping structure is a translation lookaside buffer.

5. A method according to claim 1, wherein the mapping structure is a table.

6. A method according to claim 1, wherein the mapping structure is a linked list.

7. A method according to claim 1, wherein the cleanup indicator for each context, the mapping indicator for each context, the mapping indicator for each translation entry and the validity flag for each translation entry are each two or more bits.

8. A method according to claim 1 further comprising:

reading the cleanup indicator for each context, wherein if the cleanup indicator for a context indicates that the context has been demapped:

scanning the mapping structure and clearing the validity flag for each of the translation entries in which the mapping indicator for the associated context does not equal the translation entry mapping indicator for the entry, and setting the cleanup indicator for the context to indicate that the context is available for mapping.

9. A method for controlling virtual memory in a computer system with a plurality of process contexts, the contexts each comprising a mapping indicator and a cleanup indicator, wherein the system comprises a mapping structure for address translations, the mapping structure comprising a plurality of translation entries, wherein the translation entries each comprise a validity flag and a translation entry mapping indicator, wherein the translation entries are each associated with one of the plurality of contexts, the method comprising:

reading the cleanup indicator for each context to identify a group of contexts, wherein if the cleanup indicator for each context in the group of contexts indicates that a context version has been demapped:

scanning the mapping structure and clearing the validity flag for each translation entry in which the mapping indicator for the associated context does not equal the translation entry mapping indicator for the entry, and setting the cleanup indicator for each context version in the group of contexts to indicate that the context version is available for mapping.

10. A memory management device for a computer system comprising:

a plurality of process contexts comprising a mapping indicator and a cleanup indicator for each context;

a mapping structure comprising a plurality of translation entries, wherein the translation entries each comprise a validity flag and a translation entry mapping indicator for the entry;

logic configured to set the translation entry mapping indicator for each translation entry associated with a given context to the value of the mapping indicator for the given context and sets set the validity flag for the entry; and logic configured to demap the given context by changing the mapping indicator for the given context.

11. A memory management device as in claim 10, wherein the logic that is configured to demap the given context is also configured to change the cleanup indicator for the given context.

12. A memory management device as in claim 10 wherein the mapping structure is a translation lookaside buffer.

13. A memory management device as in claim 10 wherein the mapping structure is a table.

14. A memory management device as in claim 10 wherein the mapping structure is a linked list.

15. A memory management device as in claim 10, further comprising:

logic configured to clear the validity flag for a given translation entry when the translation entry mapping indicator for the given translation entry does not match the mapping indicator for the context associated with the entry, when at least one cleanup indicator indicates its associated context has been demapped.

16. A computer program product for use on a computer system for controlling virtual memory, wherein the system comprises a plurality of process contexts, each process context comprising a mapping indicator and a cleanup indicator, wherein the system further comprises a mapping structure for address translations, the structure comprising a plurality of translation entries, wherein the translation entries each comprise a validity flag and a mapping indicator, wherein the computer program product comprising a computer usable medium having a computer readable program code thereon, the computer readable program code including program code for:

setting the translation entry mapping indicator for each translation entry associated with a given context to the value of the mapping indicator for the given context;

setting the validity flag for each translation entry associated with the given context; and demapping the given context by changing the mapping indicator for the given context.

17. A computer program product according to claim 16, wherein the program code for demapping the given context further comprises code for changing the cleanup indicator for the given context.

18. A computer program product according to claim 17, the computer readable program code further comprising program code for:

reading the cleanup indicator for each context to identify a group of contexts, wherein if the cleanup indicator for each context in the group of contexts indicating indicates that a context version has been demapped:

scanning the mapping structure and clearing the validity flag for each translation entry in which the mapping indicator for the associated context does not equal the translation entry mapping indicator for the entry, and setting the cleanup indicator for each context version in the group of contexts to indicate that the context version is available for mapping.

19. A method for controlling virtual memory in a computer system with a plurality of process contexts, wherein the system comprises a mapping structure for address translations, wherein the mapping structure comprises a plurality of translation entries, the method comprising:

setting a translation entry mapping indicator for each translation entry associated with a given context to the value of a mapping indicator for the given context;

setting a validity flag for each translation entry associated with the given context; and demapping the given context by changing the mapping indicator for the given context and clearing the validity flag for a given translation entry when the translation entry mapping indicator for the given translation entry does not match the mapping indicator for the given context associated with the entry.

20. A method for controlling virtual memory in a computer system with a plurality of process contexts, wherein the system comprises a mapping structure for address translations, wherein the mapping structure comprises a plurality of translation entries, the method comprising:

setting a translation entry mapping indicator for each translation entry associated with a given context to the value of a mapping indicator for the given context;

setting a validity flag for each translation entry associated with the given context;

reading a given translation entry and accessing a physical memory location based at least on the validity flag for the given translation entry and also based on whether the translation entry mapping indicator value for the given translation entry equals the mapping indicator value for the given context associated with the entry; and demapping the given context by changing the mapping indicator for the given context.

21. A system, comprising:

a memory management device for controlling virtual memory in the system, the memory management device comprising:

a plurality of process contexts comprising a mapping indicator and a cleanup indicator for each context;

a mapping structure comprising a plurality of translation entries, wherein the translation entries each comprise a validity flag and a translation entry mapping indicator for the entry;

logic configured to set the translation entry mapping indicator for each translation entry associated with a given context to the value of the mapping indicator for the given context and set the validity flag for the entry;

logic configured to read a given translation entry and to access a physical memory location based at least on the validity flag for the given translation entry and also based on whether the translation entry mapping indicator value for the given translation entry equals the mapping indicator value for the given context associated with the entry; and logic configured to demap the given context by changing the mapping indicator for the given context.

22. A system as in claim 21, further comprising:

logic configured to read the cleanup indicator for each context, wherein if the cleanup indicator for a context indicates that the context has been demapped:

the logic configured to read the cleanup indicator for each context is also configured to scan the mapping structure and clear the validity flag for each of the translation entries in which the mapping indicator for the associated context does not equal the translation entry mapping indicator for the entry, and the logic configured to read the cleanup indicator for each context is further configured to set the cleanup indicator for the context to indicate that the context is available for mapping.

\* \* \* \* \*

UNITED STATES PATENT AND TRADEMARK OFFICE
CERTIFICATE OF CORRECTION

PATENT NO.    : 6,826,671 B2
DATED         : November 20, 2004
INVENTOR(S)   : Ostrovsky et al.

It is certified that error appears in the above-identified patent and that said Letters Patent is hereby corrected as shown below:

Column 7,
Line 35, please delete "the given context and sets" and substitute -- the given context and --.

Column 8,
Line 19, please delete "group of context indicating" and substitute -- group of context --.

Signed and Sealed this

Fifth Day of April, 2005

JON W. DUDAS
*Director of the United States Patent and Trademark Office*